US006172220B1

(12) United States Patent
Pardy et al.

(10) Patent No.: US 6,172,220 B1
(45) Date of Patent: Jan. 9, 2001

(54) ISOLATED ALGAL LIPOPOLYSACCHARIDES AND USE OF SAME TO INHIBIT ENDOTOXIN-INITIATED SEPSIS

(75) Inventors: Rosevelt L. Pardy, Lincoln, NE (US); Clare L. Royce, Dunwoody, GA (US)

(73) Assignee: Board of Regents of University of Nebraska, Lincoln, NE (US)

(*) Notice: Under 35 U.S.C. 154(b), the term of this patent shall be extended for 0 days.

(21) Appl. No.: 09/008,422

(22) Filed: Jan. 16, 1998

Related U.S. Application Data
(60) Provisional application No. 60/035,863, filed on Jan. 21, 1997.

(51) Int. Cl.[7] .................................................. C07H 1/06
(52) U.S. Cl. .............................. 536/128; 514/53; 514/75; 536/123.13; 424/195.1
(58) Field of Search ................................. 514/54, 53, 23, 514/75; 424/195.1; 536/123.13, 128

(56) References Cited

U.S. PATENT DOCUMENTS

| | | | |
|---|---|---|---|
| 4,844,894 | 7/1989 | Ribi ........................................ | 424/88 |
| 4,912,094 | 3/1990 | Myers et al. ............................ | 514/54 |
| 4,929,604 | 5/1990 | Munford et al. ........................ | 514/53 |
| 5,013,661 | 5/1991 | Munford et al. ........................ | 435/197 |
| 5,041,427 | 8/1991 | Takayama et al. ..................... | 514/53 |
| 5,530,113 | 6/1996 | Christ et al. ..................... | 536/123.13 |
| 5,648,343 | 7/1997 | Carlson .................................. | 514/53 |

FOREIGN PATENT DOCUMENTS

| | | |
|---|---|---|
| 472 467 A2 | 2/1992 | (EP) . |
| 2063438 | 7/1996 | (RU) . |

OTHER PUBLICATIONS

Bruce N. Ames, "Assay of Inorganic Phosphate, Total Phosphate and Phosphatases," *Meth. Enzymol*, 1966, pp. 8:115–118.

J. Bader et al., "Action of Polymyxin B on Bacterial Membranes", I: Binding to the O–Antigenic Lipopolysaccharide of *Salmonella typhimurium, Z. naturforsch*, 1973, 28c:422–430.

A. Hoess et al., "Crystal Structure of an Endotoxin–Neutralizing Protein From the Horseshoe Crab, Limulus Anti–LPS Factor, at 1.5 A Resolution," *The EMBO Journal*, vol. 12, 1993, pp. 3351–3356.

R. C. Goldman et al., "Electrophoretic Separation of Lipop9olysaccharide Monomers Differeing in Polysaccharide Length," *Methods in Enzymology*, vol. 138, 1987, pp. 267–275.

Taku Fujiwara et al., "Chemical Immunobiological and Antigenic Characterizations of Lipopolysaccharides from *Bacteroides gingivalis* strains," *J. Gen. Microbiol.*, vol. 136, 1990, pp. 319–326.

Michael Cooperstock et al., "Polymyxin B Inactivation of Lipopolysaccharide in Vaccines of Gram–Negative Bacteria," *Infect. Immun.*, vol. 33, No. 1, Jul. 1981, pp. 315–318.

Michael S. Cooperstock, "Inactivation of Endotoxin by Polymyxin B," *Antimicrob. Ag. Chemother.*, vol. 6, No. 4, Oct. 1974, pp. 422–425.

Robert M. Bannatyne et al., "Inhibition of the Biologic Effects of Endotoxin on Neutrophils by Polymyxin B Sulfate," *J. Infect. Dis.*, vol. 136, No. 4, Oct. 1977, pp. 469–474.

Ben J. Appelmelk et al., "Polymyxin B–Horseradish Peroxidase Conjugates as Tools in Endotoxin Research," *Anal. Biochem.*, 1992, 207:311–316.

John L. Ingraham et al., "Growth of the Bacterial Cell, " *Sinauer and Associates, Inc.*, Sunderland, MA, 1983, pp. 1–48.

Jerry W. Jones et al., "Green Algal Infection in a Human," *Am. J. Clin. Pathol.*, vol. 80, No. 1, Jul. 1983, pp. 102–107.

Marlene W. Karakashian, "Symbiosis in *Paramecium Bursaria*," *Symp. Soc. Exp. Biol.*, vol. 29, 1975, pp. 145–173.

Stephen J. Karakashian, "Growth of *Paramecium Bursaria* as Influenced by the Presence of Algal Symbionts," *Physiol. Zool.*, vol. 36, 1963, pp. 52–67.

Yashwant D. Karkhanis et al., "A New and Improved Microassay to Determine 2–Keto–3–deoxyoctonate in Lipopolysaccharide of Gram–Negative Bacteria," *Anal. Biochem.*, vol. 85, No. 2, 1978, pp. 595–601.

William A. Lynn et al., "Lipopolysaccharide Antagonists," *Immunol. Today*, vol. 13, No. 7, 1992, pp. 271–276.

K.J. Mayberry–Carson et al., "Ultrastructure of Lipopolysaccharide Isolated from *Thermoplasma Acidophilum*," *J. Bact.*, vol. 121, No. 2, Feb. 1975, pp. 700–703.

Russel H. Meints et al., "Properties of the Chlorella Receptor for the Virus PBCV–1," *Virology*, vol. 164, 1988, pp. 15–21.

R.H. Meints and R.L. Pardy, "Quantitative Demonstration of Cell Surface Involvement in a Plant–Animal Symbiosis: Lectin Inhibition of Reassociation," *J. Cell. Sci.*, vol. 43, Jun. 1980, pp. 239–251.

(List continued on next page.)

*Primary Examiner*—Howard C. Lee
(74) *Attorney, Agent, or Firm*—Shook, Hardy & Bacon L.L.P.

(57) ABSTRACT

The isolation and purification of lipopolysaccharides from several related strains of eukaryotic algae is disclosed. These lipopolysaccharides have been shown to be structurally and functionally similar to the lipopolysaccharides of gram negative bacteria, or endotoxins, which have been shown to be a cause of sepsis or septic shock. The present invention also relates to the use of these algal lipopolysaccharides to inhibit the release of TNF-a from macrophages, which has been associated with the initiation and escalation of sepsis as a result of bacterial endotoxins.

4 Claims, 5 Drawing Sheets

OTHER PUBLICATIONS

David C. Morrison and Diane M. Jacobs, "Binding of Polymyxin B to the Lipid A Portion of Bacterial Lipopolysaccharides," *Immunochem.*, vol. 13, 1976, pp. 813–818.

David C. Morrison and Diane M. Jacobs, "Inhibition of Lipopolysaccharide–Inititated Activation of Serum Complement by Polymyxin B," *Infect. Immun.*, vol. 13, No. 1, Jan. 1976, pp. 298–301.

D.C. Morrison and J.A. Rudbach, "Endotoxin–Cell–Membrane Interactions Leading to Transmembrane Signaling," *Contemp. Top. Mol. Immunol.*, vol. 8, 1981, pp. 187–218.

Takashi Morita et al., "Isolation and Biological Activities of Limulus Anticoagulant (Anti–LPS Factor) Which Interacts with Lipopolysaccharide (LPS)," *J. Biochem.*, vol. 97, No. 6, 1985, pp. 1611–1620.

Noriko Nagi et al., "Application of Limulus Test (G Pathway) for the Detection of Different Conformers of $(1\rightarrow 3)$–$\beta$–D–Glucans," *Biol. Pharm. Bull.*, vol. 16, No. 9, 1993, pp. 822–828.

E. Neter et al., "The Effects of Antibiotics on Enterobacterial Lipopolysaccharides (Endotoxins), Hemagglutination and Hemolysis," *J. Immunol.*, vol. 80, 1958, pp. 66–72.

H. Wayne Nichols and Harold C. Bold, "*Trichosarcina Polymorpha*, Gen. et Sp. Nov.," *J. Phycol*, vol. 1, 1965 pp. 34–38.

Ada L. Olins and Robert C. Warner, "Physiochemical Studies on a Lipopolysaccharide from the Cell Wall of *Azotobacter Vinelandii*," *J. Biol. Chem.*, vol. 242, No. 21, Nov. 10, 1967, pp. 4994–5001.

Rosevelt L. Pardy and Leonard Muscatine, "Recognition of Symbiotic Algae by *Hydra Viridis*. A Quantitative Study of the Uptake of Living Algae by Aposymbiotic *H. Viridis*," *Biol. Bull.*, vol. 145, Dec. 1973, pp. 565–579.

R. L. Pardy and C.L. Royce, "Insights Into Symbiotic Acquisition of Organelles from Studies of the Green Hydra," *Bodega Bay Symposium Series,* Chapman and Hall, 1992, pp. 45–50.

Nilofer Qureshi et al., "Complete Structural Determination of Lipopolysaccharide Obtained from Deep Rough Mutant of *Excherichia Coli*," *J. Biol. Chem.*, Vo. 263, No. 24, Aug. 25, 1988, pp. 11971–11976.

Nilofer Qureshi et al., "Purification and Structural Determination of Nontoxic Lipid A Obtained from the Lipopolysaccharide of *Salmonella Typhimurium*," *J. Biol. Chem.*, Vo. 257, No. 19, Oct. 10, 1982, pp. 11808–11815.

R.R.B. Russell and K.G. Johnson, "SDS—Polyacrylamide Gel Electrophoresis of Lipopolysaccharides," *Can. J. Microbiol.*, vol. 21, 1975, pp. 2013–2018.

J.W. Shands et al., "The Morphologic Structure of Isolated Bacterial Lipopolysaccharide," *J. Mol. Biol.*, vol. 25, 1967, pp. 15–21.

S. Sturm et al., "Immunoblotting Procedure for the Analysis of Electrophoretically–Fractionated Bacterial Lipopolysaccharide," *Arch. Microbiol.*, vol. 140, 1984, pp. 198–201.

James L. Van Etten et al., "Viruses and Viruslike Particles of Eukaryotic Algae," *Microbiol. Rev.*, vol. 55, No. 4, Dec. 1991, pp. 586–620.

H. Shaw Warren et al., "Binding and Neutralization of Endotoxin by Limulus Antilipopolysaccharide Factor," *Infect. Immun.*, vol. 60, No. 6, Jun. 1992, pp. 2506–2513.

Stephen G. Wilkinson, "Surface Carbohydrates of the Prokaryotic Cell: Composition and Structure of Bacterial Lipopolysaccharides," *Academic Press,* London, 1977, ch. 4, pp. 97–175.

Royce et al. "Endoptoxin–like properties of an extract from a symbiotic, eukaryotic Chlorella–like green alga", J. Endotoxin Res., vol. 3(6): 437–444, 1996.*

Mikheiskaya et al., "Lipopolysaccharides from *Mastigocladus laminosus*, "Khim. Prir. Soedin., vol. 6: 700–703, 1984.*

Johnson K. "Isolation and Purification of Lipopolysaccharides", from Methods in Carbohydrate Chemistry, vol. IX, ed. by BeMiller & Whistler, pp. 3–32, 1993.*

Zahringer et al. "Molecular Structure of Lipid A, the Endotoxic Center of Bacterial Lipopolysaccharides", from Adv. in Carb. Chem., vol. 50, pp. 211–276, 1994.*

* cited by examiner

FIG. 1.

| Sample concentration LPS (ng/ml) | Binding agents and test results | | |
|---|---|---|---|
| | Control | PMB | ENP |
| $4.8 \times 10^6$ | + | + | + |
| $4.8 \times 10^5$ | + | + | + |
| $4.8 \times 10^4$ | + | + | + |
| $4.8 \times 10^3$ | + | + | + |
| $2.4 \times 10^3$ | + | + | + |
| 479 | + | + | + |
| 239 | + | + | − |
| 49 | + | − | − |
| 24 | + | − | − |
| 12 | + | − | − |
| 6 | − | − | − |

FIG. 2.

| Fatty acid methyl ester | Retention time (min) | |
|---|---|---|
| | Standard | *Chlorella* lipid A (% of total) |
| C12:O | 3.5 | 3.5 (3.0) |
| C14:O | 6.1 | 6.0 (2.6) |
| C16:O | 10.3 | 10.3 (10.3) |
| C12:β-OH | 12.4 | 12.4 (3.9) |
| C14:β-OH | 18.6 | 18.6 (5.9) |

…
ISOLATED ALGAL LIPOPOLYSACCHARIDES AND USE OF SAME TO INHIBIT ENDOTOXIN-INITIATED SEPSIS

This application claims the benefit of U.S. Provisional Application Ser. No. 60/035,863, filed Jan. 21, 1997.

BACKGROUND OF THE INVENTION

The present invention relates to the isolation and use of lipopolysaccharides from eukaryotic algae. More particularly, the present invention relates to the isolation of algal lipopolysaccharides and their use to inhibit the release of TNF-alpha from macrophages and, thus, inhibit endotoxin-initiated sepsis or septic shock.

Lipopolysaccharides are high molecular weight amphipathic molecules typically associated with the cell walls of gram negative enteric bacteria. The lipopolysaccharides of gram negative bacteria are known as endotoxins and have been found to be responsible for the pathogenicity of the bacteria. The primary pathogenicity of gram negative bacteria is its physiological interaction with a host to initiate sepsis or septic shock.

When a gram negative bacterium enters a host it begins to reproduce. As the bacteria reproduces, a number of the lipopolysaccharide molecules from the cell walls of the bacteria are shed from the organisms and are released into the circulatory system of the host. The discarded lipopolysaccharide molecules then interact with the host's immune system and begin a cascade of immunorelated physiological reactions. The lipopolysaccharides interact with the host macrophages. The interaction of lipopolysaccharides with the macrophages stimulates these white cells to release the cellular hormone TNF-alpha ("TNF-a"). This TNF-a hormone negatively impacts the host and produces a series of stereotypical responses including elevated temperature, blood coagulation, changes in white blood cell morphology and increased activity of the immune response. These responses become increasingly severe and ultimately manifest clinically as sepsis or septic shock.

In the United States alone there are believed to be approximately 300,000 cases of sepsis annually. About 150,000 of these cases are fatal. Infants, the elderly and the immunocompromised, such as AIDS victims, cancer patients and transplant recipients, are particularly susceptible to sepsis. There are presently no satisfactory treatments or cures for endotoxin-initiated sepsis. Because endotoxins provoke immunological disfunction, they cannot be used directly as immunization agents. There are currently no attenuated endotoxins or endotoxin counterparts that can be used as vaccines. The prevailing medical treatment for sepsis is founded on a symptomatic approach, treating the physical discomfort associated with the illness while hoping the disease is ultimately cured by the host's immune system. Unfortunately, as the medical field currently stands, the unlucky individual who has contracted sepsis must confront the real likelihood of death.

SUMMARY OF THE INVENTION

It is therefore a primary object of the present invention to provide a method and product for the inhibition of endotoxin-related sepsis or septic shock.

More particularly, it is an object of the present invention to provide a composition and method of using the composition to inhibit the release of TNF-a from macrophages in a host that has contacted enteric lipopolysaccharides from gram negative bacteria and, thereby, inhibit sepsis.

It is a further object of the present invention to describe a method for the isolation of a compound that can be used to inhibit the release of TNF-a from macrophages in a host that has contacted lipopolysaccharides from gram negative bacteria and, thereby, inhibit sepsis.

It is a more specific object of the present invention to disclose the isolation and purification of lipopolysaccharides from eukaryotic algae which, when introduced into a host, inhibit the release of TNF-a and, thereby, inhibit the initiation and escalation of endotoxin-initiated sepsis.

To accomplish these and other related objects, the present invention relates to the isolation and purification of lipopolysaccharides from several related strains of eukaryotic algae. These lipopolysaccharides have been shown to be structurally and functionally similar to the lipopolysaccharides of gram negative bacteria. The present invention also relates to the use of these algal lipopolysaccharides to inhibit the release of TNF-a from macrophages, which has been linked with the initiation and escalation of sepsis as a result of bacterial endotoxins.

DESCRIPTION OF THE DRAWINGS

FIG. 1 is a table showing the activity of Chlorella lipopolysaccharide in a LAL assay following incubation with polymyxin B or an endotoxin neutralizing protein.

FIG. 2 is a table showing the fatty acid composition of lipid A from Chlorella (NC64).

DETAILED DESCRIPTION OF THE INVENTION

Figure 3:
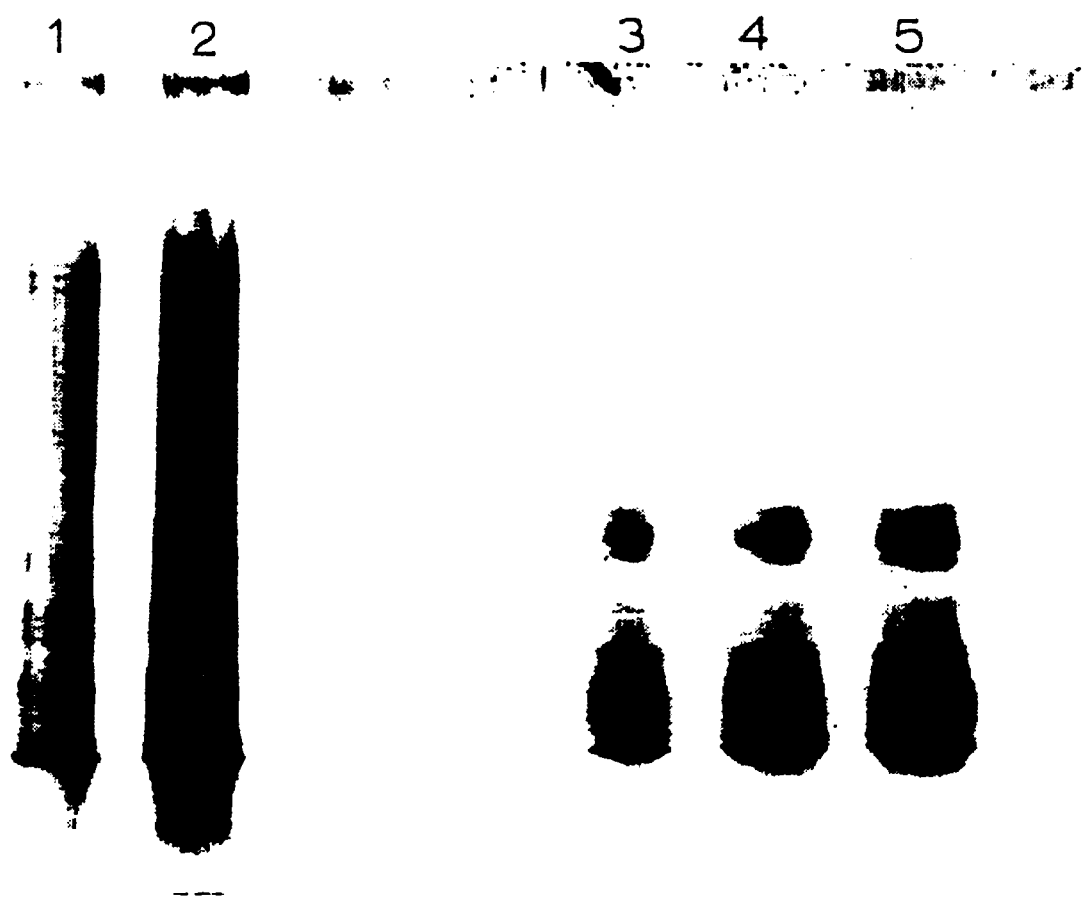
FIG. 3 is an SDS PAGE of phenol-water extract from Chlorella NC64A. Lanes 1–2 represent 2 and 5 ugs of LPS from E. coli, 128:B12 respectively. Lanes 3–5 represent 2, 5, and 10 ugs of the sample extract, respectively. The intervening lanes contained no samples to prevent possible cross contamination.

The present invention involves the isolation and purification of lipopolysaccharides from eukaryotic algae and the use of these algal lipopolysaccharides to inhibit the release of the hormone TNF-a and, thereby, inhibit the initiation of endotoxin-initiated sepsis.

Algal lipopolysaccharides can been prepared from mass cultures of several strains of algae maintained under axenic conditions. By means of well-known size exclusion chromatography and differential centrifugation, algal lipopolysaccharides of high purity for analysis and experimentation were obtained. Several cultures of isolated algal lipopolysaccharide are maintained in the refrigerator in Room 245 of the Manter Building, School of Biological Sciences, University of Nebraska, Lincoln, Nebr. 68583. While it is believed that the isolation of algal lipopolysaccharide utilizes well-known techniques and requires no undue experimentation, a culture of the algal lipopolysaccharide of the present invention has been deposited at the American Type Culture Collection (ATCC) under conditions to satisfy the Budapest Treaty and is designated Accession No. 209592. All restrictions to access of this material will be removed by applicant upon the granting of this application.

Symbiotic Chlorella sp. NC64A, originally isolated from *Paramecium bursaria,* was grown at room temperature with continuous shaking under continuous light, 25 $\mu EM^{-2}s^{-1}$ photosynthetically active radiation, in 10% Bold's basal medium supplemented with 0.72% (wv) proteose peptone, 0.5% (w/v) glucose, and 0.05% (w/v) yeast extract. Cultures were sampled every two to three days, streaked for isolation on solid media, which is the media described above plus 1.5% agar, and incubated for 24 hours at both 37° C. in the dark and 20° C. in the light to monitor for potential bacterial contamination. Contaminated batches were discarded with fewer than one out of ten batches exhibiting contamination. Cells were harvested in late log phase by centrifugation at 3000× g, 20° C. and washed three times by aseptic resuspension and centrifugation in pyrogen-free water. Cells were then lyophilized and stored at −20° C. All glassware was treated to remove endotoxin by standard extensive washing and rinsing, followed by autoclaving at 121° C., 20 psi, for one hour, and subsequent baking at 185° C. for a minimum of three hours. All reagents were prepared in glassware treated as described above using pyrogen-free water (Baxter Healthcare Corp. Deerfield, Ill. 60015).

Algal lipopolysaccharide was prepared from lyophilized cells according to the procedure set forth by Goldman and Lieve in Electrophoretic Separation of Lipopolysaccharide Monomers Differing in Polysaccharide Length, *Methods of Enzymology* 138:267–275 (1987). Lyophilized cells were suspended in pyrogen-free water (Limulus Amoebocyte Lysate Reagent Water, Associates of Cape Cod, Woods Hole, Mass.) at 10% (w/v) and mixed with an equal volume of phenol-water (9:1 v/v) at 65–68° C. for 15 minutes. The mixture was cooled to 10° C. on ice, and separated into two phases by centrifugation at 5000× g, 10° C., for 30 minutes. The upper aqueous phase was removed and the lower phenol phase was reextracted as above using an equal volume of pyrogen-free water. The aqueous phases from the two extractions were combined, lyophilized, resuspended in pyrogen-free water and chromatographed on a 10 ml column of Sephadex G-25 (Sigma Chemical Company, St. Louis, Mo.) and equilibrated with 0.05 M ammonium acetate (pH 8.1) to remove phenol. The G-25 was analyzed for the presence of contaminating endotoxin. The void volume of the column was collected, lyophilized, weighed, resuspended in pyrogen-free water and assayed for endotoxin activity.

Stock solutions of 4.7 mg/ml lyophilized were serially diluted and determinations of endotoxin activity in US (endotoxin units) were made by multiplying the sensitivity of the lysate (0.03 EU/ml, as certified by Associates of Cape Cod) by the reciprocal of the greatest dilution giving a positive result. Escherichia coil Control Standard Endotoxin (Associates of Cape Cod) was used for positive controls. Pyrogen-free water was used for negative controls. Next, 0.1 ml of lysate was added to a 75 mm commercially depyrogenated flint glass test tube (Associates of Cape Cod) containing 0.1 ml of the solution to be tested. The reaction mixture was vortexed briefly and placed in a dry block incubator at 37+−20° C. for 60+/−2 min. After incubation, the tube was carefully inverted 180°. If a solid gel-clot had formed and remained in the bottom of the tube after inversion, a positive result was recorded. If a clot was disrupted upon inversion, or no gel was formed, a negative result was recorded.

Dilutions of stock lyophilized were incubated with silica microspheres coated with an endotoxin affinity ligand, endotoxin-neutralizing protein, such as ENP, END-X B 1 5 kit (Associates of Cape Cod) or with a solution of polymyxin B sulfate (PMB, Sigma Chemical Company). Stock was added to the immobilized ligand or PMB, having a final concentration 0.5 mg/ml, and incubated with continuous shaking at room temperature. Incubation time for ENP experiments was 48 hours. Incubation time for PMB experiments was 1 hour. After incubation, 0.1 ml aliquots were assayed for activity as above. A decrease in LPS activity was determined by endpoint comparison of serially diluted samples with untreated samples.

A standard microassay procedure for KDO was performed as described previously. The absorbance was determined at 548 nm using a Beckman DU Model 2400 spectrophotometer (Beckman Instruments, Inc., Fullerton, Calif.). Authentic KDO (Sigma Chemical Company) was used to prepare a standard curve. Authentic *E. coli,* 128:B12, LPS (Sigma Chemical Company, St. Louis, Mo. 63178) was used as a positive control.

Lipid A was prepared from phenol-water extracts of whole algal cells. Lyophilized phenol-water extract from Chlorella NC64A was suspended in chloroform:methanol at a ratio of 4:1 v/v, vortexed for 2 minutes and centrifuged for 5 minutes at 10,000× g in a tabletop centrifuge. The pellet was extracted again as above, resuspended in 0.2N HCl:methanol at a ratio of 1:1 v/v, and heated at 100° C. for 45 minutes. This preparation was then cooled to room temperature and centrifuged for 5 minutes at 10,000× g in a tabletop centrifuge. The pellet was resuspended in chloroform-methanol at a ratio of 2:1 v/v. An equal volume of pyrogen-free water was added and the mixture was centrifuged for 5 minutes at 10,000× in a tabletop centrifuge. The supernatant was discarded and the pellet was dried at 50° C. under nitrogen.

Dried samples of the Chlorella lipid A extract prepared as described above were resuspended in a 4:1 chloroform-methanol and applied to 10×10 cm silica gel coated glass plates (Analtech, Inc. Newark, Del.) and subjected to radial thin-layer chromatography. The solvent was chloroform-:methanol:water:concentrated ammonium hydroxide at a ratio of 50:25:4:2 v/v/v/v, respectively. Chromotograms were developed by the application of 4% potassium dichromate in 40% sulfuric acid as a spray followed by heating for 30 minutes at 130° C.

Lyophilized phenol-water extracts were suspended in sterilized, double distilled water and sonicated at full power for 60 one second bursts using an Ultrasonic Sonicator (Heat Systems, Inc. Farmingdale, N.Y.). For ultracentrifugation purification, the suspension was then centrifuged at 105,000 g for 4 hours. The resulting pellet was subjected to two additional cycles of centrifugation. Approximately 1 mg of the final pellet was subjected to hydrolysis and methylation as described by Wollenweber and Rietschel. The resulting methylated fatty acids were concentrated and then analyzed by gas chromatography. Fatty acid methyl esters were chromotographed by temperature programming at 2° C. per minute from 150 to 220° C. Injections were made in split mode, 45:1, and separations were carried out with a helium carrier gas at 0.6 ml/minute. Fatty acid esters were identified by comparison with authentic standards purchased form Sigma Chemical Company (St. Louis, Mo.).

SDS-PAGE, sodium dodecyl sulfate-polyacrylamide gel electrophoresis, was performed according to the method of Goldman and Lieve. Samples were applied to nongradient gels of 12.5% acrylamide. Authentic *E. coli,* 128:B12, LPS (Sigma Chemical Company, St. Louis, Mo. 63718) was also applied in separate wells as a control. Electrophoresis was performed at constant voltage of 125 millivolts using Tris-glycine-SDS running buffer at a pH of 8.3 and allowed to continue until the tracking dye had migrated to the lower edge of the gel. Gels were fixed overnight in a solution of 40% (v/v) methanol and 10% (v/v) glacial acetic acid, stained with Coomassie blue (0.1% w/v Coomassie Blue R0250, BioRad Laboratories, Richmond Calif., in 40% methanol and 10% v/v glacial acetic acid), destained in fixing solution, and then over-stained with silver (Silver Stain Kit for Polyacrylamide Gels, Sigma Chemical Company, St. Louis, Mo.).

Lyophilized phenol-water extracts testing positive for LPS activity were suspended in pyrogen-free water at a concentration of 5 mg/ml and examined by transmission electron microscopy (TEM) after negative staining. For negative staining, a drop of the mixture was placed on a Formvar coated 300 mesh copper grid followed by a drop of 2% phosphotungstic acid. Excess material was removed with filter paper. The grid with stained sample was allowed to air dry and examined using a Philips 201 electron microscope at an accelerating voltage of 60 kV.

One of the properties of enteric LPS is its ability to induce gelation of Limulus amoebocyte lysate (LAW) and the inhibition of this reaction by polymyxin B and endotoxin neutralizing protein. The Chlorella extracts were examined for LAL activity using gelation and inhibition techniques to ascertain gelation.

The dry weight of the lyophilized phenol water extracts from Chlorella used for analyses was about 6.8% of the initial dry weight of the algal cells. To estimate the endotoxin activity of these extracts, solutions of lyophilisate at a concentration of 4.8 mg/ml were diluted with pyrogen-free water and assayed for LAL activity. To estimate the level of endotoxin activity in the stock solution, the sensitivity of the lysate was multiplied by the reciprocal of the greatest dilution giving a positive result. The sensitivity of the Limulus amoebocyte lysate was 0.03 EU/ml (as certified by Associates of Cape Cod, Woods Hole, Mass.). The greatest dilution giving a positive result was $1.4 \times 10^5$, giving an activity of 2,500 EU/mg. This is reported at the Table of FIG. 1.

To determine if the Chlorella LAL gelation activity would be inhibited with endotoxin neutralizing protein and/or polymyxin B, phenol water extracts were treated with these reagents and then analyzed for LAL activity. Results of these experiments are shown in the Table of FIG. 1 and indicate that phenol water extracts of Chlorella contain a factor that promotes gelation, which is LAL positive. The inhibition experiments provide data showing that the gelation factor exhibits behavior similar to enteric LPS. Together these observations suggest that phenol water extracts of Chlorella contains a factor similar to enteric LPS.

Two principal chemical moities associated with most enteric LPS are 2-keto-3-deoxyoctulosonic acid (KDO), a sugar associated with the inner core, and β-OH myristic acid, an ester linked, long chain fatty acid associated with the lipid A domain. Phenol-water extracts of Chlorella were examined for the presence of these two constituents.

When analyzed for KDO, 2.7 mg of LPS-containing fraction from symbiotic Chlorella gave an absorbance of 0.470 and 1.9 mg of *E. coli* 128:B12 gave an absorbance of 0.730 at 548 mn. These absorbances corresponded to 6.0 and 8.9 ug of KDO for Chlorella and *E. coli*, respectively. For the qualitative analysis of fatty acids by gas chromatography, the methylated products resulting from hydrolysis of Chlorella phenol-water extract were analyzed. This analysis showed the methylated hydrolysate contained many constituents and that the fatty constituents are more complex than typically found in enteric lipid A. However, as seen in the Table of FIG. 2, the identification of significant amounts of β-OH-myristic and β-OH-lauric acids is consistent with the presence of LPS.

When analyzed with SDS-PAGE, LPS typically separates into distinct bands showing characteristic profiles. When phenol-water extracts from Chlorella were analyzed using SDS-PAGE, banding patterns similar to those of enteric bacteria were obtained. This is shown in FIG. 3. Because the bands did not stain with Coomassie blue and were persistent after treatment with proteinase K, it can be concluded that these bands were not the result of protein in the phenol-water extracts. The gels did not contain detectable RNA.

Figure 4:
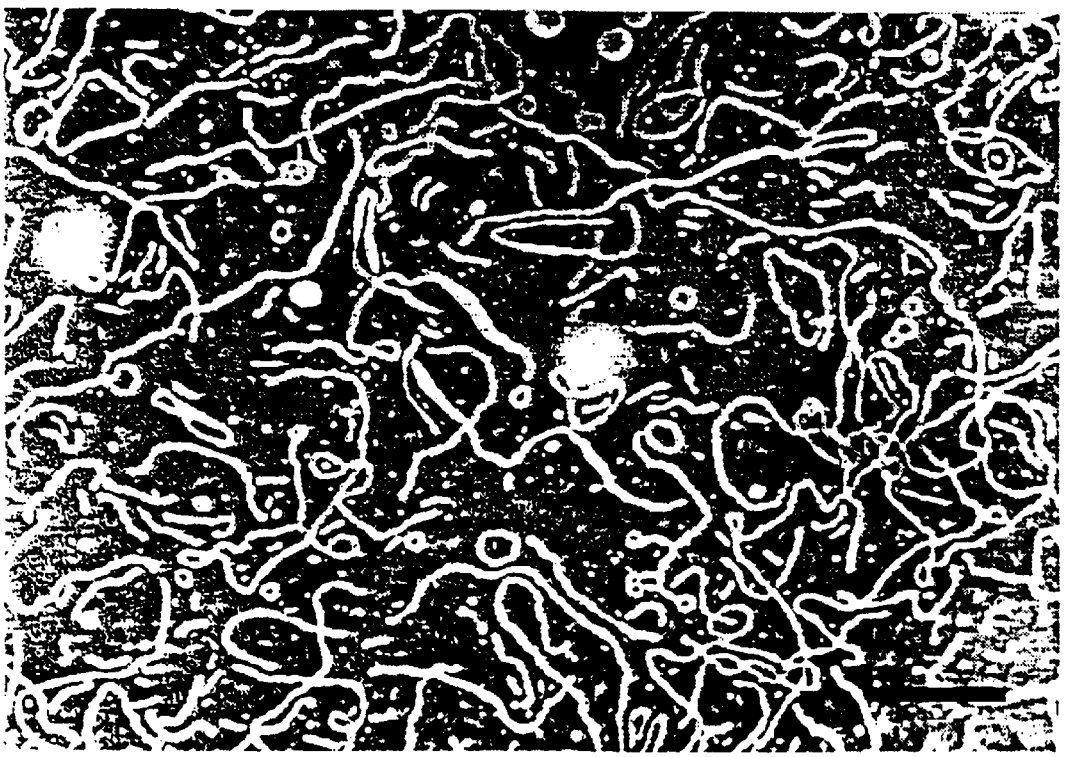
FIG. 4 is a TEM representation of LPS aggregates. The phenol-water extract from Chlorella NC64A is present in the amount of 5 mg/ml. The bar equals 40 nm.

Dried suspensions of enteric LPS form residues consisting of molecular aggregates possessing characteristic morphology visible with transmission electron microscopy. FIG. 4 is a transmission electron micrograph of dried, negatively stained Chlorella LPS. Long, rod-like structures with an average width of 5 to 7 mn were the predominant morphological figures structures observed. Some branced structures were noted. This morphology was similar to that seen in electron micrographs of bacterial LPS.

Figure 5:
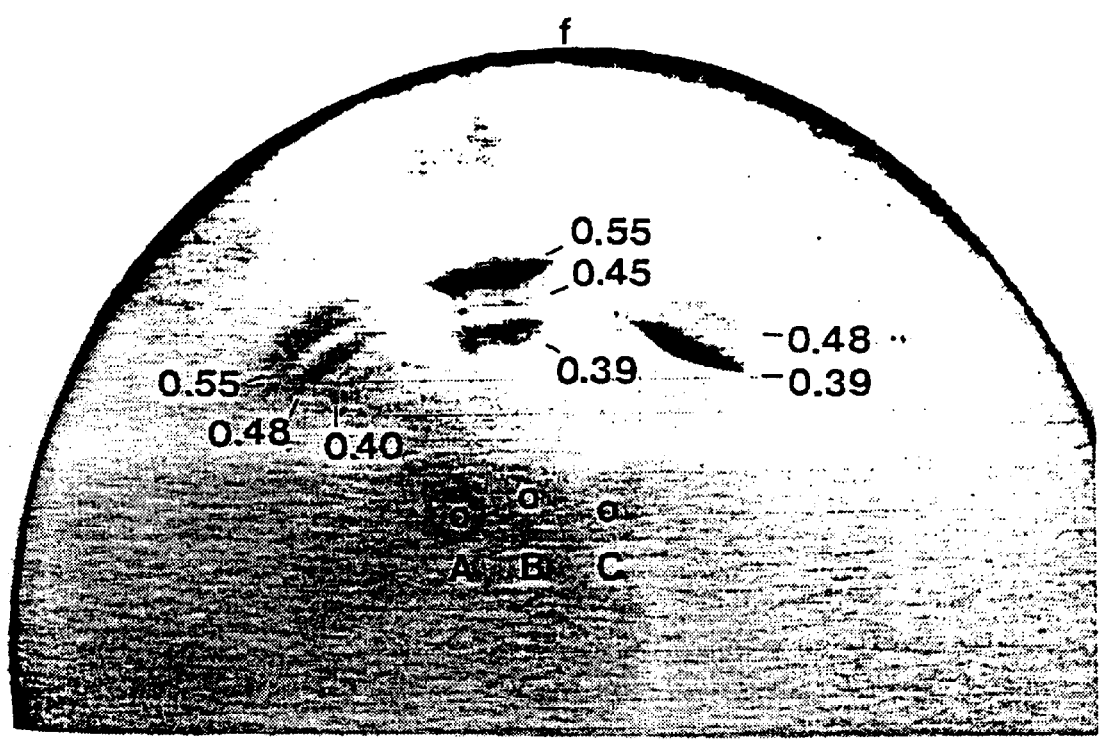
FIG. 5 is a radial thin-layer chromatogram. The arc represents the solvent front (f). Rf values are indicated for each spot. Sample A is E. coli lipid A, sample B is E. coli D3 I m4 lipid A, and sample C is lipid A from symbiotic Chlorella. The point of sample application is denoted by "o" which is the origin.

Lipid A is a chacracteristic and defining component of LPS. To determine if lipid A was a component of phenol-water extracts of Chlorella, we analyzed hydrolysates of phenol water extracts using thin-layer chromatography. FIG. 5 is a radial thin-layer chromatogram showing the migration of three samples of lipid A from different sources. Lane A is lipid A prepared from LPS of *E. coli* AB I 157 (Sigma Chemical Co. St. Louis, Mo.) and shows three bands with Rf values of 0.40, 0.48, and 0.55. Lane B is lipid A from *E. coil* D3 Im4 and shows three bands with Rf values of 0.39, 0.45 and 0.55. Lane C is lipid A from Chlorella NC64A, which shows two bands with Rf values of 0.39 and 0.48. These data indicate that mild acid hydrolysis of Chlorella phenol-water extracts yields products that, when analyzed with thin-layer chromatography, co-migrate with lipid A species prepared from enteric bacteria.

Algal LPS may be isolated from preparations of symbiotic algae. This is an unexpected and unprecedented finding. Experimental evidence was produced showing eukaryotic algae have the capacity to synthesize a structurally conserved LPS. This conclusion is based on evidence from the reactivity of phenol-water extracts to the Limulus amoebocyte lysate assay, the inhibition of LAL gel-clot activity in extracts treated with ENP and PMB, the detection of KDO, lipid A, β-hydroxy fatty acids, the appearance of molecular aggregates under transmission electron micrography and the electrophoretic profile of extracts subjected to SDS-PAGE.

It was preliminarily concluded that contamination of algal cultures by bacteria was the source of LPS. All cultures were sampled and inoculated on Petri plates at each media transfer to monitor for bacterial and fungal contamination and contaminated cultures or reagents were autoclaved and disdcarded. Thus, all preparations of algae used to prepare LPS extracts were free of detectable microbes. Further, reagent preparation was done in endotoxin-free glassware using pyrogen-free water.

An additional reason against a finding of bacterial contamination is based on the observaton that the lyophilized phenol-water extracts accounted for about 6.8% of the initial dry cell mass. If symbiotic Chlorella produced no LPS and if all LPS activity had come from bacterial contamination, then, because the dry weight of LPS from phenol-water extracted *E. coli* corresponds to 3.4% for the dry cell weight, cultures would have to contain more bacteria than algae by weight to produce that amount of LPS. This is a condition which would be readily observable under the microscope. Thus, it must be concluded that microbial contamination is not the source of the LPS of the present invention.

Limulus amoebocyte lysate is an aqueous extract of phagocytes of the horseshoe crab, *Limulus polyphemus*. When LAL is mixed with a solution containing bacterial endotoxin or lipopolysaccharide, a quantifiable reaction occurs that is distinguished by an increase in turbidity and formation of a solid gel. One of the significant characteristics of the Chlorella extract is the ability to initiate gelation of LAL, supporting the conclusion of the presence of endotoxin in the extract. LAL coagulates in the presence of either LPS or (1-3)-p-D-glucans. In the case of LPS, the coagulation pathway is mediated by a specific zymogen, factor C, and in the case of p-D-glucans, the same coagulation pathway is mediated by another specific zymogen, factor G. p-D-glucans are produced by a variety of organisms, including algae. To determine if the positive gel-clot reaction obtained in the LAL assay was caused by LPS or by D-glucans, samples of the lyophilisate from phenol-water extracts of symbiotic Chlorella were treated with agents known to bind to the lipid A portion of LPS, specifically, polymyxin B sulfate, and endotoxin-neutralizing protein. Both of these LPS binding agents are known to reduce or neutralize the biological activity of LPS in vitro. In this way, it could be determined whether LPS or p-D-glucans was the LAL-active factor the algal extracts. The presence of LPS could be implied if a reduction in endotoxin activity in the LAL assay resulted after pretreatment of the sample with an LPS-binding agent. Similarly, the presence of p-D-glucans would be suspected as the clotting pathway initiator if there was no decrease in endotoxin activity as measured by the LAL assay after pretreatment of a sample with LPS-binding agent. Treatment of the extract with either ENP or PMB resulted, respectively, in 97.5% and 95% reduction of endotoxin activity, thus supporting the conclusion that gel-clot activity is initiated by the interaction of LPS with factor C. Control studies have confirmed that the gel filtration medium used in algal LPS purification does not provide an exogenous source of P-D-glucans. These studies suggest probable structural and conformational similarity of algal LPS with bacterial LPS. This allows a prediction of conservation of biosynthetic mechanism for production of LPS in both prokaryotes and eukaryotes.

ENP is thought to bind to the phosphoglucosamine portion of lipid A, and the interaction between PMB and LPS involves the lipid A-KDO region of the LPS molecule. Results of the polymyxin B LAL inactivation experiments together with detecting the presence of KDO in Chlorella extracts allow assumptions to be made regarding the chemical composition of algal LPS. Certain species of gram-negative bacteria (Bacteroides sp.) produce LPS that is deficient in KDO. This type of LPS is resistant to inactivation by PMB. Because PMB binds to the lipid A-KDO region of LPS, the deficiency or inaccessibility of KDO impairs the ability of PMB to bind to the LPS molecule. Because the preparataions of algal LPS tested positively for KDO and were inactivated by PMB in the LAL assay, it can be predicted that KDO is an integral component of LPS produced by symbiotic Chlorella.

Lipid A, the biologically active and most conserved moiety of endotoxins, was prepared by acid hydrolysis of LPS. During hydrolysis the bond between lipid A and KDO is cleaved, producing monophosphoryl lipid A. Monophosphoryl lipid A is heterogeneous with respect to the number of fatty acid chains. This heterogeneity can be resolved by TLC. Preparation of and subsequent analysis by TLC showed it to migrate similarly to lipid A prepared from *E. coli* D3 1 me. The migration pattern on TLC suggests that algal lipid A contains molecules having the penta-acyl configuration of fatty acids.

Gas chromatography of methylated products of hydrolyzed lipid A yielded approximately 20 major peaks. Of the five peaks, two were β-hydroxy fatty acids (methyl esters of lauric and myristic), the signature fatty acids of "classical" lipopolysaccharide lipid A. The remaining, unidentified peaks are probably other fatty acids and/or other compounds resulting from the hydrolysis reactions. The presence of lipid A and the typical lipid A fatty acids suggests that the algae have biosynthetic pathways similar to gram negative pathways, a prediction that can be tested to varying degrees by analyzing the alga for the presence of the key enzymes involved in lipid A synthesis.

Transmission electron microscopic examination of reconstituted, lyophilized phenol-water preparations of symbiotic Chlorella showed ribbon-like structures about 5 to 7 μm wide. This can bee seen in FIG. 4. These structures were similar to the structures seen in electron micrographs of negatively-stained bacterial LPS, thus providing additional evidence for the existence of algal LPS.

The silver staining pattern of othe phenol water extracts following separation on 12.5% polyacrylamide gel is shown in FIG. 3 lanes 3, 4, 5. The broad band at the lower edge of each lane is thought to be lipid A or LPS having fewer repeating oligosaccharide units. The demonstration that Chlorella LPS can be separated by SDS-PAGE, resulting in a characteristic profile, will be useful in determining the size of the LPS subunits once standardization is routine and comparison of the profiles with LPS of other algal strains can be made. Electrophoresis of algal LPS could prove to be useful in taxonomic studies of those algal strains producing it.

It is not presently known how these eukaryotes came to possess molecules which virtually define the gram negative bacteria. Examination of thin section sof algae by TEM has not revealed the presense of intracellular bacteria. The role of these putative LPS in the biology of Chlorella is also unknown. Preliminary experiments in our laboratory indicate that pathogenetic Chlorella possess LPS-like material as well as non-pathogenic, freeliving Chlorella. Furthermore, evidence is accumulating that the LPS is a component of the cell walls of symbiotic Chlorella and is a crucial element in attachment of the PBCV-1 virus. Published reports indicate the possible role of polysaccharide in virus binding to symbiotic Chlorella but a definitive description of the viral binding site has been elusive. The presence of LPS in symbiotic Chlorella may help explain certain recognition phenomena involving the algae and their hosts. Promoting host cell phagocytosis and the subsequent escape from lysosomal digestion may be loci for algal LPS action in algal endosymbioses.

Chemical analysis of algal lipopolysaccharide molecules indicated that they possess chemical moieties similar to enteric endotoxins such as ketodeoxyoctonate, lipid A and beta-hydroxy myristic acid. Furthermore, like enteric endotoxins, algal lipopolysaccharides induce a positive reaction in the Limulus amoebocyte lysate assay. The apparent structural and functional similarity of algal lipopolysaccharides to enteric endotoxins allows the algal molecules to interact with endotoxin binding/receptor sites present on endotoxin sensitive TNF-a releasing cells. Thus, algal lipopolysaccharides may impact to some extent endotoxin-induced sepsis.

This was verified empirically through experiments on galactose amine model mice, a genetically engineered mouse particularly suseptible to contracting endotoxin-initiated sepsis. It is well known that if small doses of enteric lipopolysaccharide were injected into galactose amine model mice, nearly 100 percent lethality would be expected as a result of endotoxin-initiated sepsis. Therefore, given the many similarities between enteric lipopolysaccharides and algal lipopolysaccharides, it would be expected that small doses of algal lipopolysaccharides injected into these mice would also cause them to die. Surprisingly, this does not occur.

Otherwise lethal doses of algal lipopolysaccharide were injected into galactose amine model mice. Contrary to reasonable expectations, no mice died. In fact, no mice developed symptoms indicative of the existence endotoxin-initiated sepsis. The mice were apparently clinically unaffected by the injection.

Another experiment produced even more profound unexpected results. In this experiment, mice simultaneously were given lethal doses of bacterial endotoxin along with equal doses of algal lipopolysaccharide. Historical experimental data establishes at least 80 percent of the mice would die from sepsis. However, when given simultaneous injections of enteric endotoxin and algal lipopolysaccharide, over 80 percent of the mice survived. The results of this experiment show that not only does algal lipopolysaccharide fail to initiate sepsis or sepsis symptoms, but that it also may inhibit the onset of sepsis in the presence of enteric endotoxins.

While the exact mechanism for these phenonoma are unknown and currently under investigation, it is presently believed algal lipopolysaccharides fail to elicit and may, in fact, block the TNF-a secretion response of the macrophages and, hence, prevent the onset of sepsis. Mouse macrophages presented with a stimulating dose of bacterial endotoxin were inhibited from releasing TNF-a in a dose dependent manner by algal lipopolysaccharide. This clearly suggests a mechanism whereby algal lipopolysaccharide protects mice against the lethal effects of endotoxin by inhibiting the endotoxin-induced release of TNF-a by the macrophage effector cells. As discussed above, the release of TNF-a is a critical step in the initiation of sepsis by gram negative bacteria. Therefore, by blocking the release of TNF-a, the algal lipopolysaccharide molecules inhibit the initiation and escalation of endotoxin-initiated sepsis and, thereby, protect mice from the lethality of injected endotoxins purified from enteric bacteria.

The findings that algal lipopolysaccharides can prevent or reduce the lethality of endotoxins in mice and that the algal lipopolysaccharide molecules prevent the release of TNF-a by macrophages are of great importance to the study of endotoxin induced sepsis. The present invention could be the key component in the design of therapeutic or immunizing agents against sepsis and, as a consequence, could save many lives.

Although the preferred embodiment of the invention has been described with some particularity, many modifications and variations of the preferred embodiment are possible in the light of the above teachings. It is to be understood that, within the scope of the appended claims, the invention can be practiced other than as specifically described.

All references disclosed and cited herein are hereby incorporated in their entirety.

What is claimed is:

1. A method of isolating algal lipopolysaccharide from ATCC Accession No. 209592 comprising:

providing a sample of algae; and recovering the algal lipopolysaccharide from the algae utilizing lyophilization techniques.

2. A method of isolating algal lipopolysaccharide from ATCC Accession No. 209592 comprising:

providing a sample of ATCC Accession No. 209592; and recovering the algal lipopolysaccharide from the algae utilizing electrophoretic separation.

3. A method of isolating algal lipopolysaccharide from ATCC Accession No. 209592 comprising:

providing a plurality of algae cells;

lyophilizing the algae cells;

suspending the lyophilized algae cells in a solution of pyrogen-free water and phenol-water to form a lyophilized mixture;

separating the lyophilized mixture into an aqueous phase and a phenol phase; and recovering the isolated algal lipopolysaccharide from the aqueous phase.

4. The method of claim 3 wherein the separating step further comprising lyophilizing the aqueous phase of the separated mixture.

* * * * *